(12) United States Patent
White

(10) Patent No.: US 7,694,228 B2
(45) Date of Patent: *Apr. 6, 2010

(54) METHODS, SYSTEMS, AND PRODUCTS FOR NETWORK CONFERENCING

(75) Inventor: Wesley White, Kennesaw, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 954 days.

This patent is subject to a terminal disclaimer.

(21) Appl. No.: 10/854,452

(22) Filed: May 26, 2004

(65) Prior Publication Data

US 2005/0268242 A1 Dec. 1, 2005

(51) Int. Cl.
*G06F 17/00* (2006.01)
(52) U.S. Cl. .................................. 715/751; 715/753
(58) Field of Classification Search ................ 709/204; 715/751
See application file for complete search history.

(56) References Cited

U.S. PATENT DOCUMENTS

| | | | |
|---|---|---|---|
| 4,736,407 A | 4/1988 | Dumas | |
| 4,796,293 A | 1/1989 | Blinken | |
| 5,365,577 A | 11/1994 | Davis et al. | |
| 5,524,110 A * | 6/1996 | Danneels et al. | 709/204 |
| 5,530,472 A | 6/1996 | Bregman | |
| 5,537,548 A | 7/1996 | Fin | |
| 5,659,692 A | 8/1997 | Poggio | |
| 5,701,301 A | 12/1997 | Weisser, Jr. | |
| 5,784,561 A | 7/1998 | Bruno | |
| 5,822,525 A | 10/1998 | Tafoya | |
| 5,838,774 A | 11/1998 | Weisser, Jr. | |
| 5,844,979 A * | 12/1998 | Raniere et al. | 379/202.01 |
| 5,854,893 A | 12/1998 | Ludwig | |
| 5,884,032 A | 3/1999 | Bateman | |
| 5,978,463 A | 11/1999 | Jurkevics | |
| 5,978,806 A | 11/1999 | Lund | |
| 5,995,608 A | 11/1999 | Detampel, Jr. | |
| 5,999,966 A | 12/1999 | McDougall | |
| 6,049,602 A | 4/2000 | Foladare | |
| 6,061,440 A | 5/2000 | Delaney et al. | |
| 6,064,730 A | 5/2000 | Ginsberg | |
| 6,105,055 A * | 8/2000 | Pizano et al. | 709/204 |
| 6,108,687 A | 8/2000 | Craig | |
| 6,148,068 A | 11/2000 | Lowery | |
| 6,181,786 B1 | 1/2001 | Detampel, Jr. | |
| 6,233,605 B1 | 5/2001 | Watson | |
| 6,295,551 B1 * | 9/2001 | Roberts et al. | 709/205 |
| 6,446,113 B1 | 9/2002 | Ozzie | |
| 6,502,126 B1 * | 12/2002 | Pendakur | 709/204 |
| 6,560,637 B1 | 5/2003 | Dunlap | |
| 6,654,785 B1 * | 11/2003 | Craig | 709/203 |
| RE38,457 E | 3/2004 | Rothrock et al. | |
| 6,714,635 B1 | 3/2004 | Adams | |

(Continued)

*Primary Examiner*—William L Bashore
*Assistant Examiner*—Daeho D Song
(74) *Attorney, Agent, or Firm*—Scott P. Zimmerman PLLC

(57) ABSTRACT

Methods, systems, and products are disclosed for conducting a conference amongst remote participants. During the conference an object from a library of digital objects is communicated to a participant communications device via a distributed computing network. During the conference the library of digital objects is downloaded to the participant communications device. During the conference a synchronization command is communicated from a host communications device to the participant communications device. The synchronization instructs the participant communications device to present another object from the library of digital objects. A synchronization acknowledgment is received from the participant communications device and confirms a successful presentation of the object on the participant communications device.

19 Claims, 7 Drawing Sheets

U.S. PATENT DOCUMENTS

| | | |
|---|---|---|
| 6,791,974 B1 | 9/2004 | Greenberg |
| 6,857,009 B1 * | 2/2005 | Ferreria et al. .............. 709/219 |
| 6,907,449 B2 | 6/2005 | Srinivasan |
| 7,003,550 B1 | 2/2006 | Cleasby et al. |
| 7,007,003 B1 * | 2/2006 | Rybicki ...................... 707/1 |
| 7,068,680 B1 | 6/2006 | Kaltenmark et al. |
| 7,124,164 B1 | 10/2006 | Chemtob |
| 7,124,166 B2 * | 10/2006 | Brown ....................... 709/204 |
| 7,165,112 B2 | 1/2007 | Battin et al. |
| 7,222,305 B2 | 5/2007 | Teplov et al. |
| 7,266,609 B2 * | 9/2007 | Bill et al. .................... 709/231 |
| 7,328,243 B2 | 2/2008 | Yeager et al. |
| 7,353,252 B1 | 4/2008 | Yang et al. |
| 7,403,969 B2 * | 7/2008 | White ........................ 709/204 |
| 7,526,524 B2 * | 4/2009 | White ........................ 709/204 |
| 7,571,117 B1 * | 8/2009 | Nakajima ................... 705/26 |
| 7,587,037 B2 * | 9/2009 | White .................. 379/202.01 |
| 7,587,452 B2 * | 9/2009 | White ........................ 709/204 |
| 2001/0036224 A1 * | 11/2001 | Demello et al. ............. 375/220 |
| 2002/0095460 A1 * | 7/2002 | Benson ....................... 709/204 |
| 2002/0112004 A1 * | 8/2002 | Reid et al. .................. 709/205 |
| 2002/0188678 A1 | 12/2002 | Edecker |
| 2003/0014488 A1 * | 1/2003 | Dalal et al. ................. 709/204 |
| 2003/0072429 A1 | 4/2003 | Slobodin et al. |
| 2003/0093476 A1 | 5/2003 | Syed |
| 2003/0112772 A1 * | 6/2003 | Chatterjee et al. ........... 370/316 |
| 2003/0140121 A1 * | 7/2003 | Adams ....................... 709/219 |
| 2003/0191805 A1 | 10/2003 | Seymour et al. |
| 2004/0103150 A1 | 5/2004 | Ogdon et al. |
| 2004/0208303 A1 | 10/2004 | Rajagopalan et al. |
| 2004/0253991 A1 | 12/2004 | Azuma |
| 2004/0266412 A1 | 12/2004 | Maes et al. |
| 2005/0054445 A1 * | 3/2005 | Gatto et al. ................... 463/42 |
| 2005/0240679 A1 * | 10/2005 | White ........................ 709/248 |

\* cited by examiner

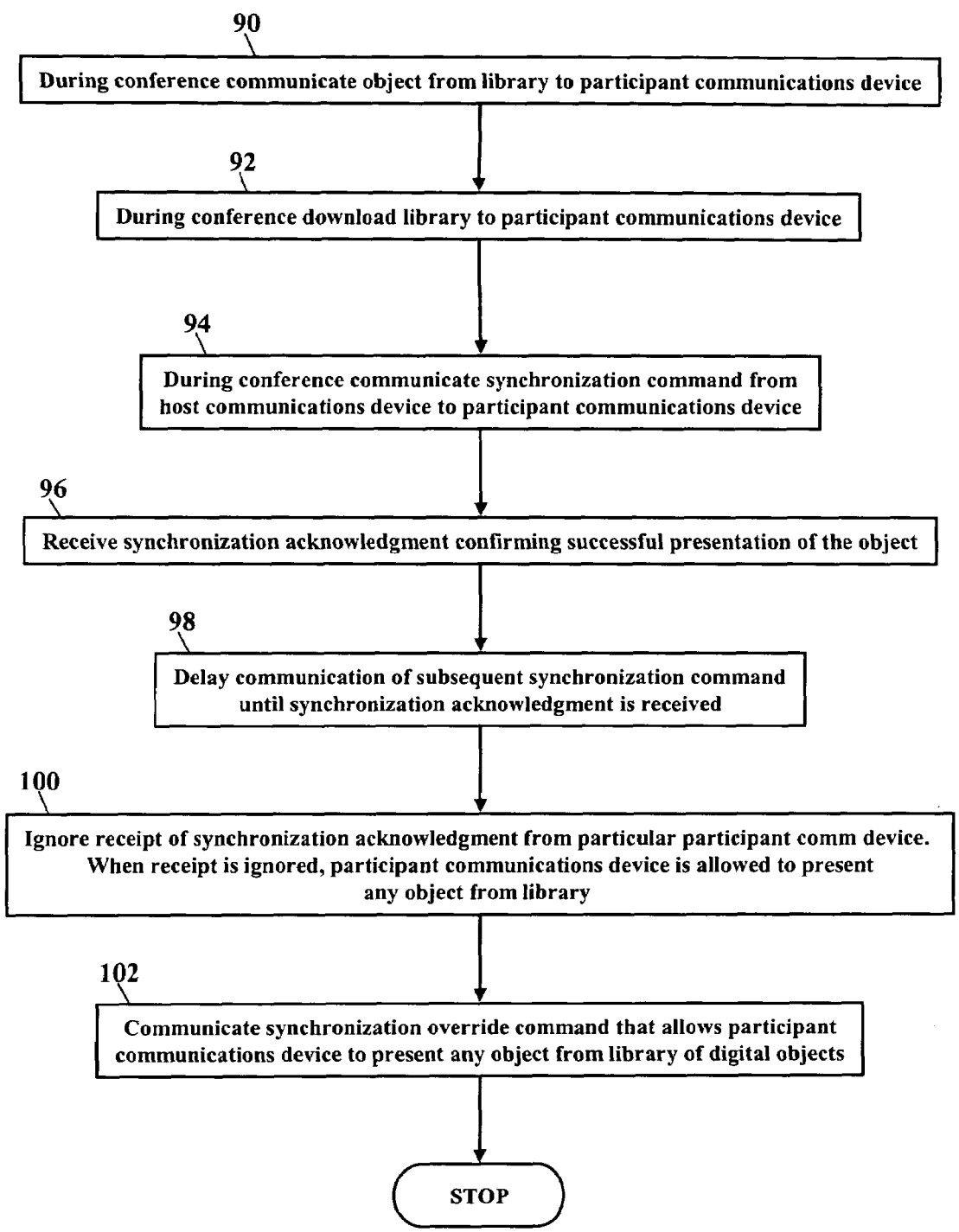

METHODS, SYSTEMS, AND PRODUCTS FOR NETWORK CONFERENCING

CROSS-REFERENCE TO RELATED APPLICATIONS

This application relates to the Assignee's co-pending and commonly-assigned U.S. application Ser. No. 10/831,517, filed Apr. 23, 2004, of which the "Brief Summary of the Invention" section and the "Detailed Description of the Invention" sections are incorporated hereon by reference.

This application relates to applicant's co-pending and commonly-assigned U.S. application Ser. No. 10/853,871, entitled "Network Conference Using Method For Distributed Computing And/Or Distributed Objects," filed simultaneously herewith and of which the "Brief Summary of the Invention" and "Detailed Description of the Invention" sections are incorporated herein by this reference.

This application relates to applicant's co-pending and commonly-assigned U.S. application Ser. No. 10/854,055, entitled "Network Conferencing Using Method For Concurrent Real Time Broadcast And Distributed Computing And/Or Distributed Objects", filed simultaneously herewith and of which the "Brief Summary of the Invention" and "Detailed Description of the Invention" sections are incorporated herein by this reference.

This application relates to applicant's co-pending and commonly-assigned U.S. application Ser. No. 10/853,872, entitled "Network Conferencing Using Method For Distributed Computing And/Or Distributed Objects To Intermediate Host For Presentation To a Communications Device", filed simultaneously herewith and of which the "Brief Summary of the Invention" and "Detailed Description of the Invention" sections are incorporated herein by this reference.

This application relates to applicant's co-pending and commonly-assigned U.S. application Ser. No. 10/854,324, entitled "Network Conferencing Using Method For Distributed Computing And/Or Distributed Objects For Presentation To A Mobile Communications Device", filed simultaneously herewith and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to electrical computers and, more particularly, to multi-computer data transfer for conferencing and for synchronizing.

2. Description of the Related Art

Bandwidth is a problem when conferencing. Video and/or desktop conferencing, such as training sessions and other distributed presentations, often requires real-time streaming of the presentation materials. If the remote participants are few in number, and/or if the presentation materials are small in size, real-time data streaming may provide an adequate quality of presentation. If, however, there are many remote participants, real-time streaming poses several problems. As the number of remote participants increases, the required bandwidth also increases. Fifty (50) remote participants, for example, could require fifty (50) real-time data streams fanning out from the host computer to each remote participant. As the number of remote participants increases, the host computer is also taxed to manage communications with all the remote participating computers. All the participants to the conference, then, eventually suffer from network congestion and from degradation in processor performance. The quality of the conference is reduced, and all the participants to the conference have a less-than-desired experience. There is, accordingly, a need in the art for methods, systems, and products for improved conferencing among remote participants. There is also a need for reducing the bandwidth required when conferencing that does not rely upon real-time streaming.

BRIEF SUMMARY OF THE INVENTION

The aforementioned problems, and other problems, are reduced by this invention. This invention comprises methods, computer systems, computer programs, and computer program products that improve conferencing among remote participants. This invention allows a late-joining conference participant to "catch-up" with the other participants. That is, if a conference participant joins a conference that is already in progress, this invention allows that late-joining participant to not only view a current presentation object, but this invention also downloads a library of presentation objects. Although the participant belatedly joins the conference, this invention allows the participant to receive all the presentation materials. Once the library of presentation objects is downloaded to the participant's communications device, the invention need only then communicate a synchronization command. The synchronization command instructs the participant's communications device to present an object from the library of digital objects. Once the library of presentation objects is built on the participant's communications device, real-time streaming of presentation materials is no longer required. This invention, then, allows the late-joining participant to "catch-up" with the other participants without requiring a continuous, high-bandwidth data stream throughout the presentation.

The synchronization commands are configurable. The synchronization commands help ensure all participants are synchronized to the host's presentation. As the conference host progresses through the presentation, this invention tells the host what participants are lagging behind and/or jumping ahead in the materials. This invention can even prevent the host from advancing in the presentation materials until all participants have viewed/heard/loaded the current presentation. This invention, then, allows the host to have greater knowledge of the audience, thus allowing the host to tailor the pace of the conf to suit the participants. This invention may even permit one or more privileged participants to ignore the synchronization commands and, instead, "roam" throughout the presentation materials.

This invention discloses methods, systems, and products for conducting a conference. One of the embodiments describes a method for managing a conference amongst remote participants. During the conference an object from a library of digital objects is communicated to a participant communications device. The object is communicated via a distributed computing network. Also during the conference the library of digital objects is downloaded to the participant communications device via the distributed computing network. Also during the conference a synchronization command is communicated from a host communications device to the participant communications device via the distributed computing network. The synchronization command instructs the participant communications device to present another object from the library of digital objects. A synchronization acknowledgment is received from the participant communications device, and the synchronization acknowledgment confirms a successful presentation of the object on the participant communications device.

Other embodiments of this invention describe a system for managing a conference amongst remote participants. The system comprises a Conferencing Module stored in a memory device, and a processor communicating with the memory device. During the conference, the Conferencing Module communicates an object from a library of digital objects to a participant communications device. The object communicates via a distributed computing network. During the conference, the Conferencing Module downloads the library of digital objects to the participant communications device via the distributed computing network. During the conference, the Conferencing Module communicates a synchronization command from a host communications device to the participant communications device via the distributed computing network. The synchronization command instructs the participant communications device to present another object from the library of digital objects. The Conferencing Module may also receive a synchronization acknowledgment from the participant communications device. The synchronization acknowledgment confirms a successful presentation of the object on the participant communications device.

Other embodiments of this invention describe a computer program product. A computer-readable medium stores a Conferencing Module. During the conference, the Conferencing Module communicates an object from a library of digital objects to a participant communications device. The object communicates via a distributed computing network. During the conference, the Conferencing Module downloads the library of digital objects to the participant communications device via the distributed computing network. During the conference, the Conferencing Module communicates a synchronization command from a host communications device to the participant communications device via the distributed computing network. The synchronization command instructs the participant communications device to present another object from the library of digital objects. The Conferencing Module may also receive a synchronization acknowledgment from the participant communications device. The synchronization acknowledgment confirms a successful presentation of the object on the participant communications device.

Other systems, methods, and/or computer program products according to embodiments will be or become apparent to one with skill in the art upon review of the following drawings and detailed description. It is intended that all such additional systems, methods, and/or computer program products be included within this description, be within the scope of this invention, and be protected by the accompanying claims.

BRIEF DESCRIPTION OF THE SEVERAL VIEWS OF THE DRAWINGS

These and other features, aspects, and advantages of the embodiments of this invention are better understood when the following Detailed Description of the Invention is read with reference to the accompanying drawings, wherein:

FIG. 7 is a flowchart illustrating a method of conducting a conference amongst remote participants, according to even more embodiments of this invention.

DETAILED DESCRIPTION OF THE INVENTION

Figure 1:
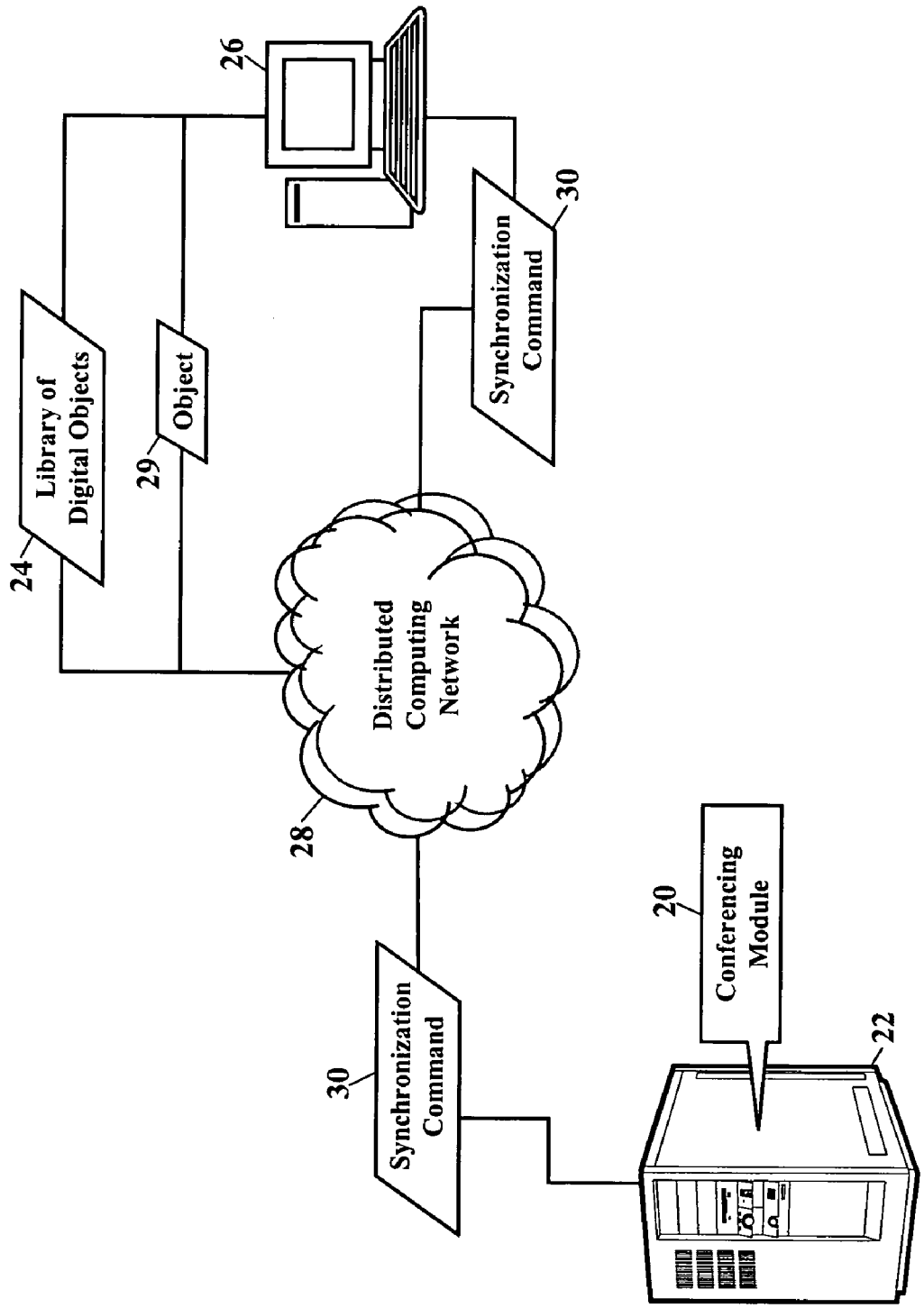
FIGS. 1 and 2 are schematics illustrating the embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention improves conferencing among remote participants. This invention allows a late-joining conference participant to "catch-up" with the other participants. That is, if a conference participant joins a conference that is already in progress, this invention allows that late-joining participant to not only view a current presentation object, but this invention also downloads a library of presentation objects. Although the participant belatedly joins the conference, this invention allows the participant to receive all the presentation materials. Once the library of presentation objects is downloaded to the participant's communications device, the invention need only then communicate a synchronization command. The synchronization command instructs the participant's communications device to present an object from the library of digital objects. Then, once the library of presentation objects is built on the participant's communications device, real-time streaming of presentation materials is no longer required. This invention, then, allows the late-joining participant to "catch-up" with the other participants without requiring a continuous, high-bandwidth data stream throughout the presentation.

The synchronization commands are configurable. The synchronization commands help ensure all participants are synchronized to the host's presentation. As the conference host progresses through the presentation, this invention tells the host what participants are lagging behind and/or jumping ahead in the materials. This invention can even prevent the host from advancing in the presentation materials until all participants have viewed/heard/loaded the current presentation. This invention, then, allows the host to have greater knowledge of the audience, thus allowing the host to tailor the pace of the conference to suit the participants. This invention may even permit one or more privileged participants to ignore the synchronization commands and, instead, "roam" throughout the presentation materials.

FIG. 1 is a schematic illustrating this invention. The embodiments of this invention include a host-resident Conferencing Module 20. The Conferencing Module 20 comprises methods, systems, computer programs, and/or computer program products that manage a conferencing session amongst participant communications devices. Although the Conferencing Module 20 operates within any communications device, FIG. 1 shows the Conferencing Module 20 operating within a host computer 22. During the conference, a library 24 of digital objects is communicated to each participant communications device 26. The library 24 of digital objects may be communicated via a distributed computing network 28, such as the Internet (sometimes alternatively known as the "World Wide Web"), an intranet, a local-area network (LAN), and/or a wide-area network (WAN). The library 24 of digital objects can be any audible and/or visual presentation materials. The library 24 of digital objects, for example, may include slides (such as MICROSOFT® POWERPOINT® file(s)), pictures, documents, audio, video, and/or any other computer file that can be stored on and/or presented on the participant communications device 26 (MICROSOFT® and POWERPOINT® are registered trademarks of Microsoft Corporation, One Microsoft Way, Redmond Wash. 98052-6399, (425) 882-8080).

This invention also communicates an object 29 from the library 24 of digital objects. During the conference, the Conferencing Module 20 communicates the object 29 from the library 24 of digital objects to the participant communications device 26. The object 29 communicates via the distributed computing network 28. The object 29 can be any object in the library 24 of digital objects, although the object 29 is preferably a current presentation object being shown/discussed by the conference host. Because the participant communications device 26 has belatedly joined the conference, the object 29 allows the late-joining conference participant to "catch-up" with the other participants. That is, not only does the Conferencing Module 20 download the library 24 of digital objects, but the conference host's current presentation object 29 is also downloaded. The belated participant, using the participant communications device 26, views/hears the current object 29 while also receiving the library 24 of digital objects.

Synchronization commands are then issued during the conference. When the host computer 22 and the participant communications device 26 agree to conference (e.g., "handshake" and/or initialization commands), these synchronization commands control presentation of the object 29 and/or the library 24 of digital objects. The synchronization command 30 commands/instructs the participant communications device 26 to visually and/or audibly present a selected object from the library 24 of digital objects. That is, as the host computer 22 switches from one object to another object in the library 24 of digital objects, each synchronization command 30 instructs the participant communications device 26 to "follow along" and synchronize with the host computer 22. So, once the library 24 of objects is built on the participant's communications device 26, real-time streaming of the library 24 of objects is no longer required. Because the late-joining participant communications device 26 now stores/caches the library 24 of objects, a continuous, high-bandwidth data stream is no longer required. As the conference progresses, the Communications Module 20 now need only communicate the synchronization command 30. The synchronization command 30 requires less bandwidth, so the Communications Module 20 "swaps" over and instructs the participant communications device 26 to "follow along" and synchronize with the host computer 22.

Figure 2:
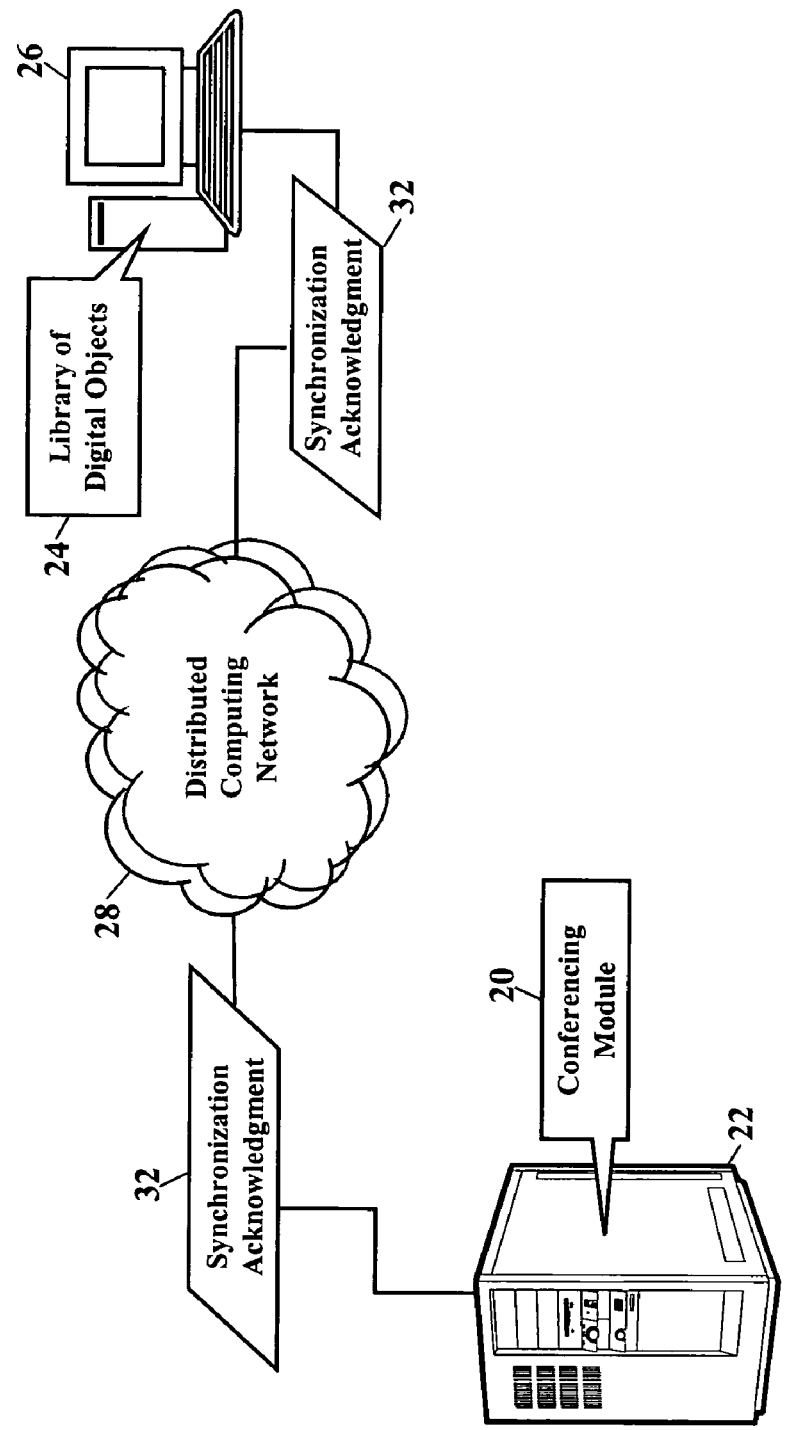

FIG. 2 is a schematic illustrating more embodiments of this invention. When each participant communications device 26 receives the synchronization command (shown as reference numeral 30 in FIG. 1), the conference participants may also acknowledge synchronization. When the participant communications device 26 successfully presents the object from the library 24, the participant communications device 26 may return communicate a synchronization acknowledgment 32. The synchronization acknowledgment 32 communicates via the distributed computing network 28. The synchronization acknowledgment 32 confirms the successful presentation of the object on the participant communications device 26. If the synchronization acknowledgment 32 is not received, or reports a failure/error, the Communications Module 20 knows the participant communications device 26 may not be synchronized.

The synchronization acknowledgment 32 provides several advantages. The synchronization acknowledgment 32 helps ensure that all participants are synchronized before the host advances to the next object in the library 24 of digital objects. The Conferencing Module 20, for example, can use the synchronization acknowledgment 32 to force the host computer 22, and thus the host, to delay communication of any subsequent synchronization commands. The host is forced to wait until the participant communications device 26 return communicates the synchronization acknowledgment 32. That is, the host cannot jump to another object in the library 24 until all participants have successfully presented the present object. The Conferencing Module 20 can even visually and/or audibly inform the host of which participants are synchronized and of which participants are lagging.

The Conferencing Module 20 can also ignore the synchronization acknowledgment 32. The synchronization acknowledgment 32, as explained above, helps ensure that all participants are synchronized before the host advances to the next/selected selected object in the library 24 of digital objects. The Conferencing Module 20, however, can be configured to ignore receipt of one or more synchronization acknowledgments 32. That is, the Conferencing Module 20 may allow the host computer, and thus the host, to advance to the selected object in the library 24 without first receiving the synchronization acknowledgment 32 from the participant communications device 26. This feature allows a particular participant to "jump" ahead, or lag behind, and view/hear any object from the library 24 of digital objects. The host might determine that some participants are privileged, and these privileged participants need not be synchronized. If, for example, the conference is a training session, some portions of the training session might already be known to some participants, so these "privileged" participants are not required to synchronize. A participant might also be a high-ranking individual in an organization, so the host might configure that high-ranking participant as a "privileged" participant. The host may even establish various levels of privileges, according to the rank of the participants, the knowledge of the participants, and/or any other criterion/criteria the host might desire. However the "privileged" participants are selected, the Conferencing Module 20 can be configured to ignore receipt of the synchronization acknowledgment 32. The Conferencing Module 20 can be configured to permit the host computer to advance/return to any object in the library 24 without first receiving the synchronization acknowledgment 32 from a particular participant communications device.

Figure 3:
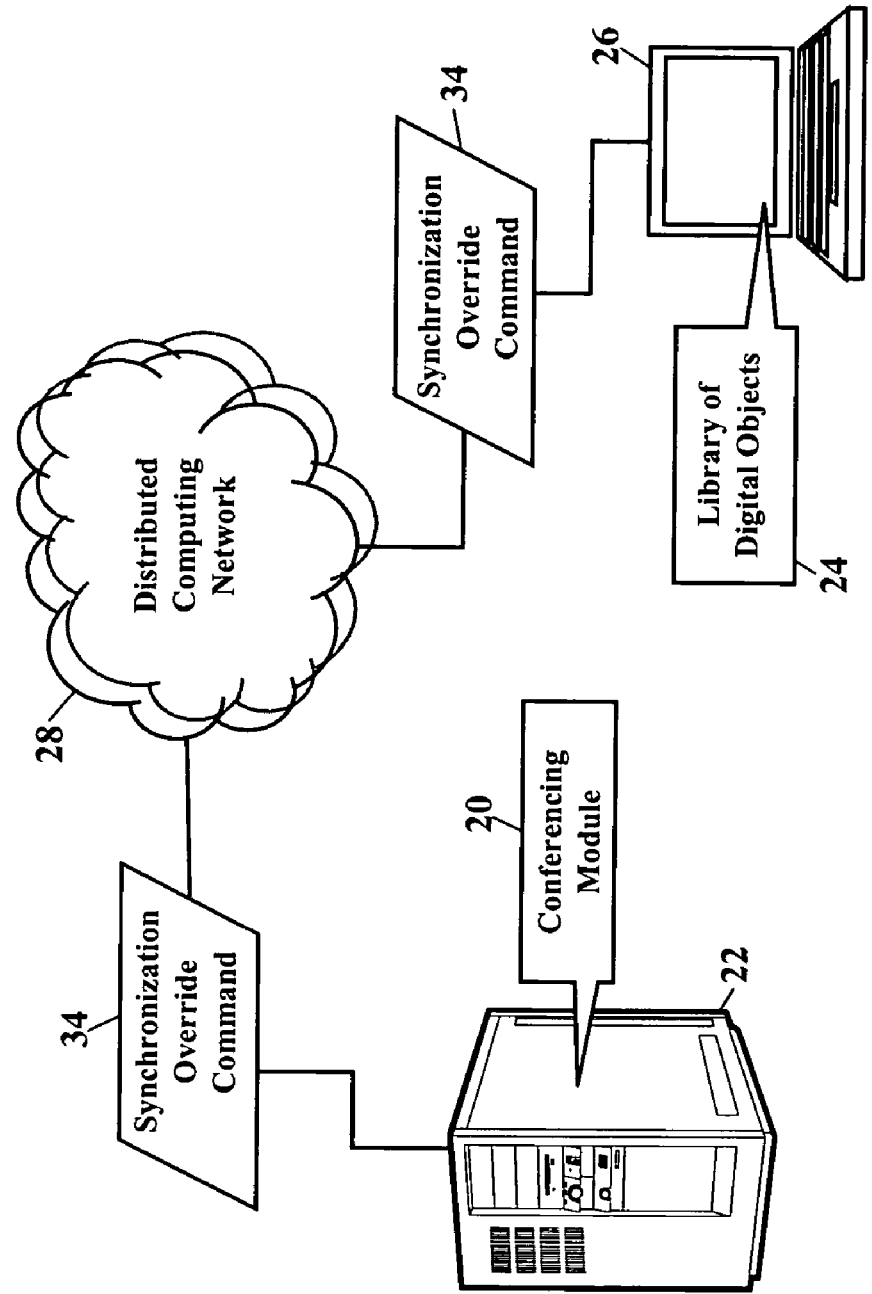
FIG. 3 is a schematic illustrating more embodiments of this invention.

FIG. 3 is a schematic illustrating another of the embodiments of this invention. Here the Conferencing Module 20 may send a synchronization override command 34. This synchronization override command 34 communicates from the host communications device 36 (such as the host computer 22) to the participant communications device 26 via the distributed computing network 28. The synchronization override command 34 allows the participant communications device 26 to present any object from the library 24 of digital objects. This feature again allows a particular participant to "jump" ahead, or lag behind, and view/hear any object from the library 24 of digital objects. The host might again determine that some participants are more privileged than others, and these privileged participants need not be synchronized. The synchronization override command 34 allows the participant to progress at their own pace. The participant may view/hear any object from the library 24 of digital objects and need not await each synchronization acknowledgment (shown as reference numeral 32 in FIG. 2).

Figure 4:
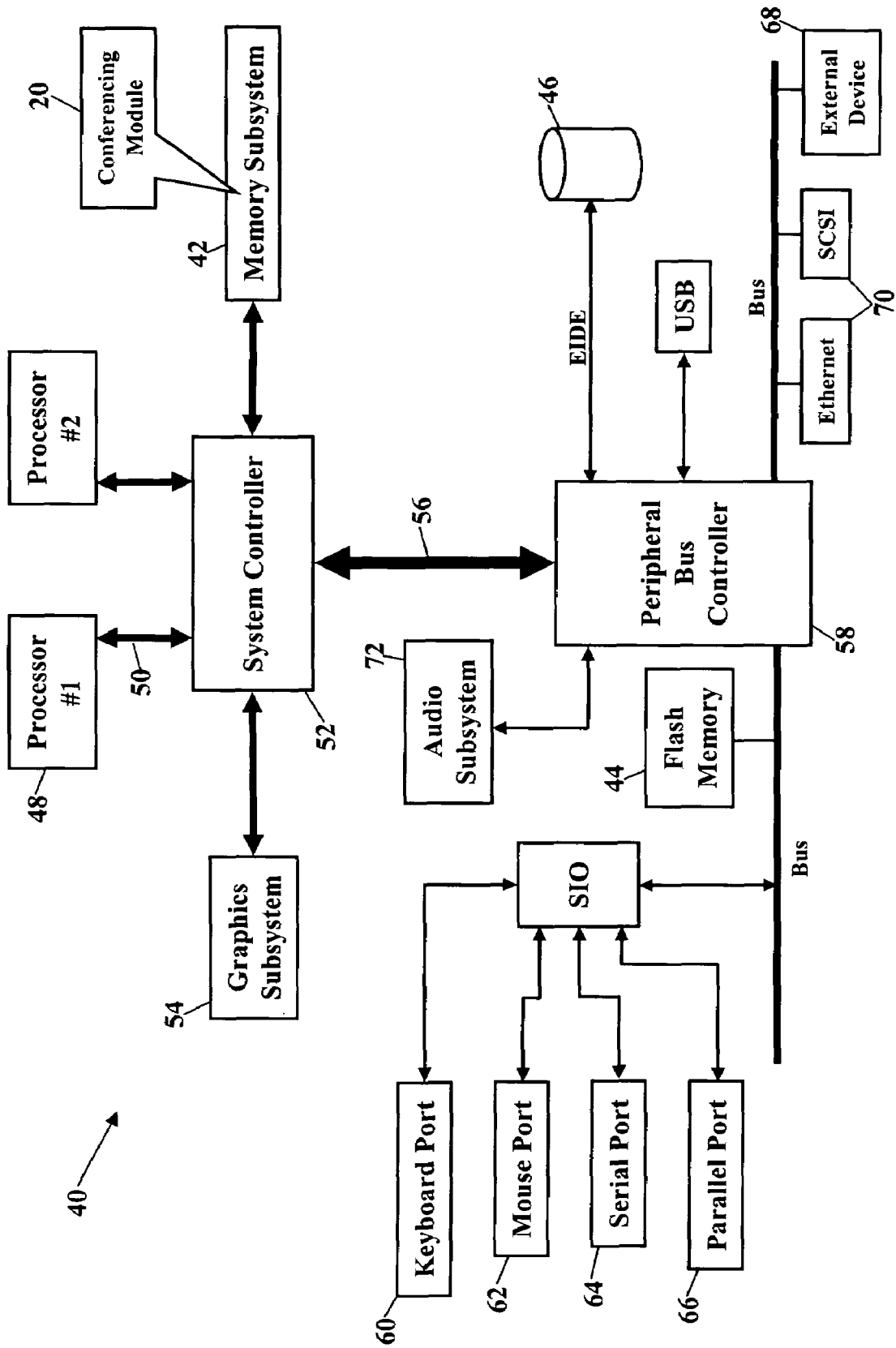
FIG. 4 is a block diagram showing a Conferencing Module 20 residing in a computer system 40, according to the embodiments of this invention.

FIG. 4 illustrates an alternative operating environment for this invention. FIG. 4 is a block diagram showing the Conferencing Module 20 residing in a computer system 40. The computer system 40 may be any computing system, such as the host computer (shown as reference numeral 22 in FIGS. 1-3), a laptop/desktop computer, a tablet computer, a server, and/or other computer systems. As FIG. 4 shows, the Conferencing Module 20 operates within a system memory device. The Conferencing Module 20, for example, is shown residing in a memory subsystem 42. The Conferencing Module 20, however, could also reside in flash memory 44 or a peripheral storage device 46. The computer system 40 also has one or more central processors 48 executing an operating system. The operating system, as is well known, has a set of instructions that control the internal functions of the computer system 40. A system bus 50 communicates signals, such as data signals, control signals, and address signals, between the central processor 48 and a system controller 52 (typically called a "Northbridge"). The system controller 52 provides a bridging function between the one or more central processors 48, a graphics subsystem 54, the memory subsystem 42, and a PCI (Peripheral Controller Interface) bus 56. The PCI bus 56 is controlled by a Peripheral Bus Controller 58. The Peripheral Bus Controller 58 (typically called a "Southbridge") is an integrated circuit that serves as an input/output hub for various peripheral ports. These peripheral ports are shown including a keyboard port 60, a mouse port 62, a serial port 64 and/or a parallel port 66 for a video display unit, one or more external device ports 68, and networking ports 70 (such as SCSI or Ethernet). The Peripheral Bus Controller 58 also includes an audio subsystem 72. Those of ordinary skill in the art understand that the program, processes, methods, and systems described in this patent are not limited to any particular computer system or computer hardware. Other architectures are possible, and the Conferencing Module 20 can operate in any architecture.

Those of ordinary skill in the art also understand the central processor 48 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), Sun Microsystems, Inc. (4150 Network Circle, Santa Clara, Calif. 95054, www.sun.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, North Carolina, 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond, Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 42, flash memory 44, or peripheral storage device 46) may also contain an application program. The application program cooperates with the operating system and with a video display unit (via the serial port 64 and/or the parallel port 66) to provide a Graphical User Interface (GUI). The Graphical User Interface typically includes a combination of signals communicated along the keyboard port 60 and the mouse port 62. The Graphical User Interface provides a convenient visual and/or audible interface with a user of the computer system 40.

Figure 5:
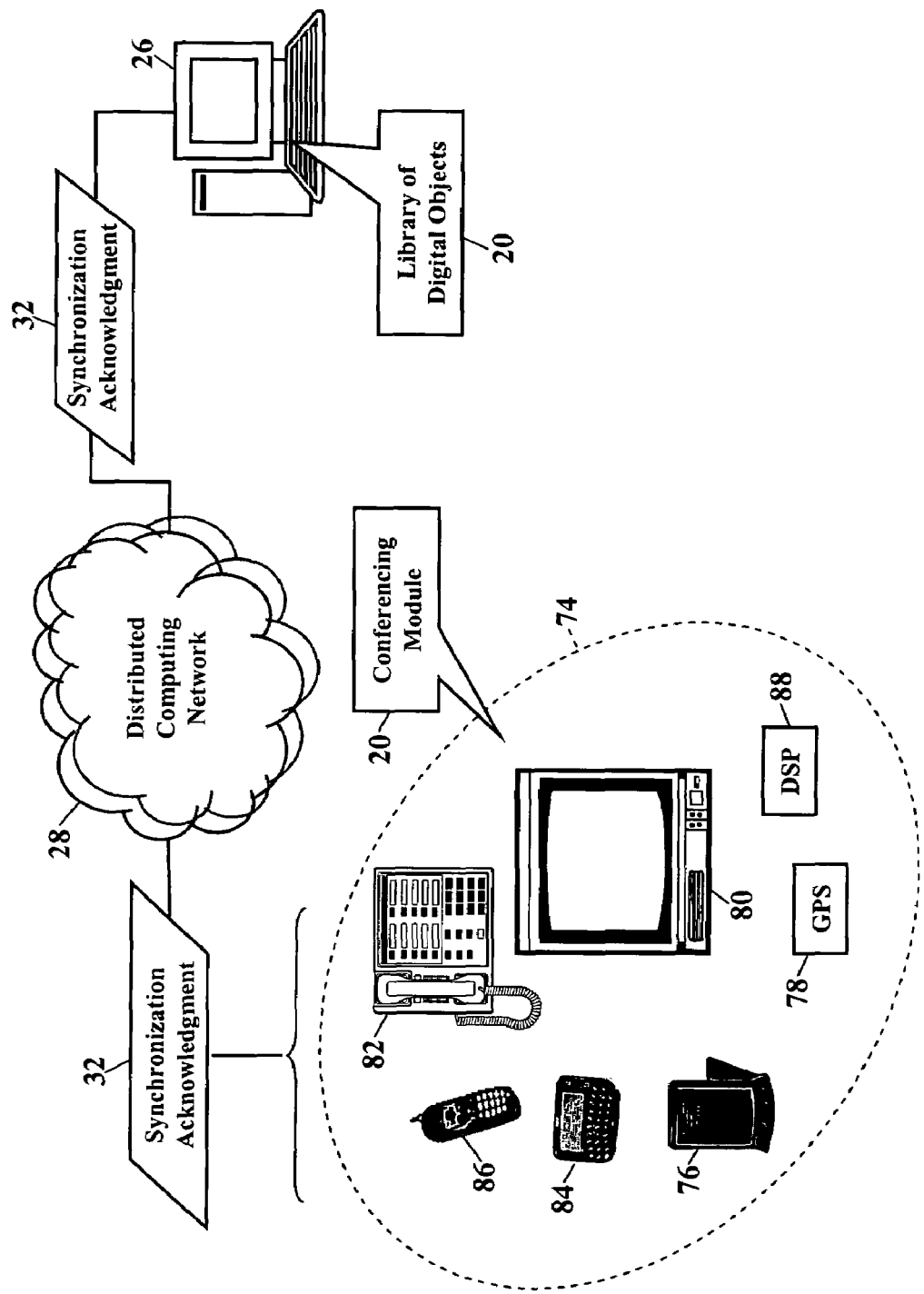
FIGS. 5 and 6 are schematics illustrating other communications devices that operate with this invention.
Figure 6:
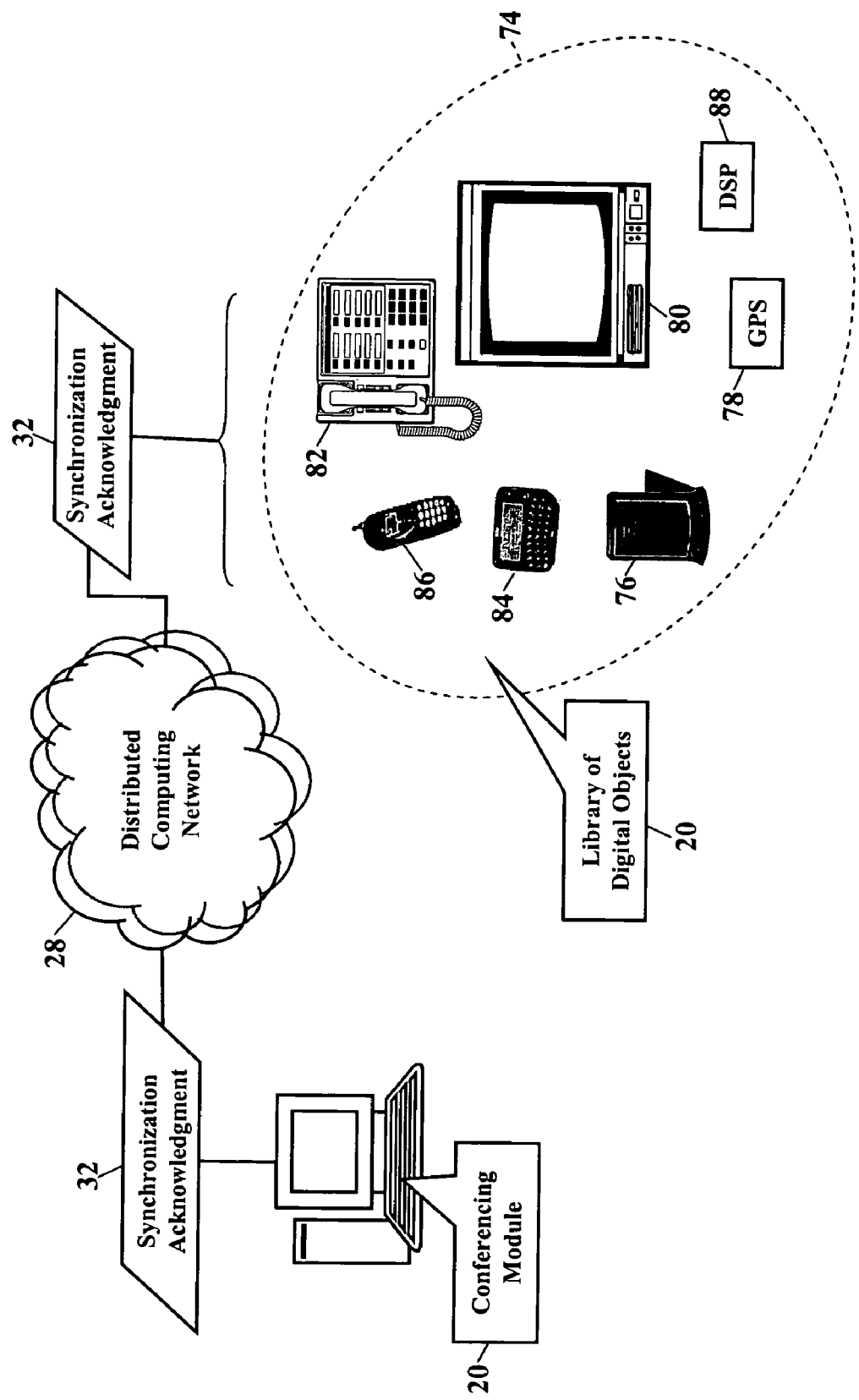

FIGS. 5 and 6 are schematics illustrating other communications devices that operate with this invention. FIG. 5 illustrates various host communications devices 74, while FIG. 5 illustrates various participant communications device 26. As FIG. 5 shows, the Communications Module 20 may operate in a personal digital assistant (PDA) 76, a Global Positioning System (GPS) device 78, an interactive television 80, an Internet Protocol (IP) phone 82, a pager 84, a cellular/satellite phone 86, or any computer and/or communications device utilizing a digital signal processor (DSP) 88. FIG. 6, likewise, illustrates that the participant communications device 26 may include the personal digital assistant (PDA) 76, the Global Positioning System (GPS) device 78, the interactive television 80, the Internet Protocol (IP) phone 82, the pager 84, the cellular/satellite phone 86, or any computer and/or communications device utilizing the digital signal processor (DSP) 88. The host communications device 74, and/or the participant communications device 26, may also include addressable watches, radios, vehicle electronics, clocks, printers, gateways, and other apparatuses and systems.

FIG. 7 is a flowchart illustrating a method of managing a conference amongst remote participants. During the conference an object from a library of digital objects is communicated to a participant communications device (Block 90). The object is communicated via a distributed computing network. Also during the conference the library of digital objects is downloaded to the participant communications device via the distributed computing network (Block 92). Also during the conference a synchronization command is communicated from a host communications device to the participant communications device via the distributed computing network (Block 94). The synchronization command instructs the participant communications device to present another object from the library of digital objects. A synchronization acknowledgment is received from the participant communications device (Block 96), and the synchronization acknowledgment confirms a successful presentation of the object on the participant communications device. The method may also delay communication of a subsequent synchronization command until the synchronization acknowledgment is received from the participant communications device (Block 98). The method may also ignore receipt of the synchronization acknowledgment from a particular participant communications device (Block 100). When receipt of the synchronization acknowledgment is ignored, a particular participant communications device is allowed to present any object from the library of digital objects. A synchronization override command may also be communicated (Block 102). The synchronization override command allows the participant communications device to present any object from the library of digital objects.

The Conferencing Module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Conferencing Module to be easily disseminated. A computer program product for managing a conference amongst remote participants includes the Conferencing Module stored on the computer-readable medium. During the conference, the Conferencing Module communicates an object from a library of digital objects to a participant communications device. The object communicates via a distributed computing network. During the conference, the Conferencing Module downloads the library of digital objects to the participant communications device via the distributed computing network. During the conference, the Conferencing Module communicates a synchronization command from a host communications device to the participant communications device via the distributed computing network. The synchronization command instructs the participant communications device to present another object from the library of digital objects. The Conferencing Module may also receive a synchronization acknowledgment from the participant communications device. The synchronization acknowledgment confirms a successful presentation of the object on the participant communications device.

The Conferencing Module may also be physically embodied on or in any addressable (e.g., HTTP, I.E.E.E. 802.11, Wireless Application Protocol (WAP)) wireline and/or wireless communications device capable of presenting an IP address. Examples could include a computer, a wireless personal digital assistant (PDA), an Internet Protocol mobile phone, or a wireless pager.

While this invention has been described with respect to various features, aspects, and embodiments, those skilled and unskilled in the art will recognize the invention is not so limited. Other variations, modifications, and alternative embodiments may be made without departing from the spirit and scope of the invention.

What is claimed is:

1. A method of managing a conference amongst remote participants, comprising:

establishing the conference amongst a host communications device, an intermediate host communications device, and a participant communications device;

prior to the conference, communicating a library of digital objects from the host communications device to the intermediate host communications device;

determining that the participant communications device is belatedly joining the conference that is already in progress;

during the conference, receiving a synchronization command at the intermediate host communications device that was sent from the host communications device, the command instructing the intermediate host communications device to retrieve a current object from memory of the intermediate host communications device that is being currently presented on the host communications device from the library of digital objects;

communicating the current object from the intermediate host communications device to the participant communications device during the conference;

receiving, at the intermediate host communications device, a synchronization acknowledgment from the participant communications device that confirms the current object was successfully presented the participant communications device;

forwarding the synchronization acknowledgment from the intermediate host communications device to the host communications device to confirm the current object was successfully presented at the participant communications device; and during the conference, downloading a remainder of the library of digital objects from the intermediate host communications device to the participant communications device.

2. A method according to claim 1, wherein when the library of digital objects is downloaded to the participant communications device, then further comprising communicating a synchronization command from the intermediate host communications device to the participant communications device that synchronizes the participant communications device to the intermediate host communications device.

3. A method according to claim 2, further comprising delaying communication of a subsequent synchronization command until the synchronization acknowledgment is received by the intermediate host communications device from the participant communications device.

4. A method according to claim 3, further comprising ignoring receipt of the synchronization acknowledgment at the intermediate host communications device, thus allowing the host communications device to advance to any object from the library of digital objects.

5. A method according to claim 1, further comprising accessing a list of participant communications devices.

6. A method according to claim 5, further comprising communicating the library of digital objects to each participant communications device in the list.

7. A system for managing a conference amongst remote participants, comprising:
   a processor communicating with memory;
   the processor establishing the conference amongst a host communications device, an intermediate host communications device, and a participant communications device;
   the processor, prior to the conference, communicating a library of digital objects from the host communications device to the intermediate host communications device;
   the processor determining that the participant communications device is belatedly joining the conference that is already in progress;
   the processor, during the conference, receiving a synchronization command at the intermediate host communications device, the command sent from the host communications device, the command instructing the intermediate host communications device to retrieve a current object from the memory of the intermediate host communications device that is being currently presented on the host communications device and to display the current object at the intermediate host communications device from the library of digital objects;
   the processor communicating the current object from the intermediate host communications device to the participant communications device during the conference;
   the processor receiving, at the intermediate host communications device, a synchronization acknowledgment from the participant communications device that confirms the current object was successfully presented the participant communications device;
   the processor forwarding the synchronization acknowledgment from the intermediate host communications device to the host communications device to confirm the current object was successfully presented at participant communications device; and
   during the conference, the processor downloads a remainder of the library of digital objects from the intermediate host communications device to the participant communications device.

8. A computer program product comprising a computer readable medium storing processor executable instructions for performing a method of managing a conference amongst remote participants, the method comprising:
   establishing the conference amongst a host communications device, an intermediate host communications device, and a participant communications device;
   prior to the conference, communicating a library of digital objects from the host communications device to the intermediate host communications device;
   determining that the participant communications device is belatedly joining the conference that is already in progress;
   during the conference, receiving a synchronization receiving a command at the intermediate host communications device, the command sent from the host communications device, the command instructing the intermediate host communications device to retrieve a current object from memory of the intermediate host communications device that is being currently presented on the host communications device and to display the current object at the intermediate host communications device from the library of digital objects;
   communicating the current object from the intermediate host communications device to the participant communications device during the conference;
   forcing the host communications device to remain at the current object; receiving, at the intermediate host communications device, a synchronization acknowledgment from the participant communications device that confirms the current object was successfully presented the participant communications device;
   forwarding the synchronization acknowledgment from the intermediate host communications device to the host communications device to confirm the current object was successfully presented at the participant communications device;
   permitting the host communications device to advance to a next object after the synchronization acknowledgment is received; and
   during the conference, downloading a remainder of the library of digital objects from the intermediate host communications device to the participant communications device.

9. A method according to claim 1, further comprising visually informing of which remote participants are synchronized to the host communications device.

10. A method according to claim 9, further comprising visually informing of which remote participants are lagging the host communications device.

11. A method according to claim 10, further comprising determining that a remote participant is privileged and need not be synchronized.

12. A method according to claim 1, wherein if the synchronization acknowledgment is received at the intermediate host communications device from the participant communications device, then allowing the host communications device to advance to the next object in the library of objects, the synchronization acknowledgment confirming a successful presentation of the current object at the participant communications device.

13. A method according to claim 1, wherein if the synchronization acknowledgment is not received from the participant communications device, then preventing the host communications device from advancing to the next object in the library of objects, such that the host communications device is forced to wait until the participant communications device is synchronized to the current object.

14. The method according to claim 1, further comprising informing the host communications device of participant communications devices that lag behind the current object.

15. The system according to claim 7, wherein the processor comprising receives a synchronization command at the intermediate host communications device to present another object from the library of digital objects.

16. The system according to claim 15, wherein the processor forwards the synchronization command to the participant communications device.

17. The computer program product according to claim 8, further comprising instructions for receiving a synchronization command at the intermediate host communications device to present another object from the library of digital objects.

18. The computer program product according to claim 8, farther comprising instructions for forwarding the synchronization command to the participant communications device.

19. The computer program product according to claim 8, farther comprising instructions for informing the host communications device of participant communications devices that lag behind the current object.

* * * * *